(12) United States Patent
Mori et al.

(10) Patent No.: US 6,579,593 B1
(45) Date of Patent: *Jun. 17, 2003

(54) SIMULATED WOOD TONE MEMBER AND METHOD OF MANUFACTURING SIMULATED WOOD TONE MEMBER

(75) Inventors: Hiroki Mori, Aichi-ken (JP); Hiroyuki Kato, Aichi-ken (JP)

(73) Assignee: Kabushiki Kaisha Tokai-Rika-Denki-Seishakusho, Aichi-ken (JP)

( * ) Notice: Subject to any disclaimer, the term of this patent is extended or adjusted under 35 U.S.C. 154(b) by 217 days.

This patent is subject to a terminal disclaimer.

(21) Appl. No.: 09/598,332

(22) Filed: Jun. 21, 2000

(30) Foreign Application Priority Data

Jul. 8, 1999 (JP) ............................... 11-194025

(51) Int. Cl.$^7$ ................................. B32B 3/00
(52) U.S. Cl. ......................... 428/156; 74/552
(58) Field of Search ............................. 428/156; 74/552

(56) References Cited

U.S. PATENT DOCUMENTS 3,816,155 A * 6/1974 Iverson et al.
5,676,899 A * 10/1997 Mrozinski et al. .......... 264/226
5,827,788 A * 10/1998 Miyakoshi .................. 442/164
6,138,526 A * 10/2000 Mori ............................ 74/552
6,211,293 B1 * 4/2001 Nakamura et al. .......... 525/131

FOREIGN PATENT DOCUMENTS

| FR | 672.153 | 12/1929 |
| GB | 2 277 051 | 10/1994 |
| JP | 63-270279 | 11/1988 |
| WO | WO99/28116 | 6/1999 |

* cited by examiner

Primary Examiner—Cynthia H. Kelly
Assistant Examiner—Tamra L. Dicus
(74) Attorney, Agent, or Firm—Nixon Peabody LLP; Thomas W. Cole

(57) ABSTRACT

A simulated wood tone member having good gradation (shading) of a wood grain pattern, and a method of manufacturing the simulated wood tone member are provided. Recesses 11 of different depths (h1, h2, h3) are formed in a surface of a urethane based base member 16 which is molded in a mold 30 in which a wood grain pattern is formed by etching in plural stages. As a result, gradation of a pattern can be expressed by the recesses 11 in the surface of the urethane based base member 16. Then, by filling a wood filler 21, which is transparent and contains a coloring agent, into the recesses 11, the gradation can be varied in accordance with the depths of the recesses 11. A wood grain pattern having an attractive wood appearance can be obtained.

14 Claims, 5 Drawing Sheets

SIMULATED WOOD TONE MEMBER AND METHOD OF MANUFACTURING SIMULATED WOOD TONE MEMBER

BACKGROUND OF THE INVENTION

1. Field of the Invention

The present invention relates to a simulated wood tone member which is used in, for example, steering systems for vehicles or boats, housing, and the like, and to a method of manufacturing the simulated wood tone member.

2. Description of the Related Art

Urethane steering wheels having a simulated wood tone member have been conventionally used in steering systems for vehicles, boats and the like.

This urethane steering wheel is formed by molding by injecting a urethane based composition into a mold in which a wood grain pattern is formed by etching, and then curing the injected urethane based composition. In this way, as illustrated in FIG. 6, recesses 52 of uniform depths are formed in the surface of a urethane steering wheel 50. By filling a wood filler 54, which has good concealability, into the recesses 52, edge grain vein-like portions appear, and the wood grain pattern decorates the surface of the urethane steering wheel 50. Further, the wood filler 54 contains 30% toner, and the toner contains 5% black pigment.

However, because the recesses are formed to the same depth, gradation (shading) of the wood grain pattern cannot be exhibited, such that it is difficult to obtain a beautiful wood appearance with attractive wood grains.

SUMMARY OF THE INVENTION

A first aspect of the present invention is a simulated wood tone member comprising: (a) a urethane-based base member having a surface with recesses formed to different depths and forming a pattern; and (b) a wood filler disposed in the recesses, the wood filler being substantially transparent and comprising at least one coloring agent.

In accordance with this structure, recesses are formed to different depths in the surface of the urethane based base member. Therefore, gradation of the pattern can be expressed. By filling-in in the recesses a wood filler which is transparent and which contains a coloring agent, the shading can be made to vary in accordance with the depths of the recesses. For example, if the pattern is a wood grain pattern, a wood grain pattern with an attractive wood appearance can be expressed.

In the first aspect of the present invention, it is preferable for the angle portions of the recesses and for the corner portions of the bottom portions of the recesses to be formed at right angles.

In accordance with this structure, because the angle portions of the recesses and the corner portions of the bottom portions of the recesses are formed at right angles, the wood filler can be reliably filled into the recesses, and the pattern can be expressed reliably.

Further, in the first aspect of the present invention, it is preferable that the transparency of the wood filler is of an extent that light can reach the bottom portions of the recesses.

In accordance with this structure, the wood filler is transparent to the extent that light can reach the bottom portions of the recesses. Thus, the shading of the pattern, which corresponds to the depths of the recesses, can be clearly formed.

A second aspect of the present invention is a method of manufacturing a simulated wood tone member, comprising the steps of: (a) etching a mold in a plurality of stages to thereby form a wood pattern due to corrosive differences; (b) forming an in-mold coating layer at an inner side of the mold; (c) injecting a urethane-based composition into the mold; (d) removing a urethane mold from the mold, formed by the urethane-based composition hardening, the urethane mold having wood grain portions; (e) filling the wood grain portions with a wood filler that is substantially transparent and comprises at least one coloring agent; and (f) forming a substantially clear color layer on the urethane mold.

A third aspect of the present invention is a method of manufacturing a simulated wood tone member comprising the steps of: (a) forming inner surface recesses of various depths in a mold by applying masking to a predetermined position of the mold, etching the mold, and etching at least one more time, with the position of the masking changed; (b) injecting a urethane-based composition into the mold; and (c) removing from the mold a urethane mold formed by the urethane-based composition hardening.

In the simulated wood tone member formed by the steps of the second and third aspects of the present invention, the recesses are formed to different depths. Therefore, gradation can be imparted to the wood grain pattern formed on the surface of the simulated wood tone member. By filling-in in the grains the wood filler which is transparent and contains a coloring agent, variations in the wood grain colors can be realized. As a result, a wood grain pattern having an attractive wood look can be expressed.

DESCRIPTION OF THE PREFERRED EMBODIMENTS

A simulated wood tone member relating to a first embodiment of the present invention will be described hereinafter with reference to the accompanying drawings and by using a steering wheel as an example.

Figure 1:
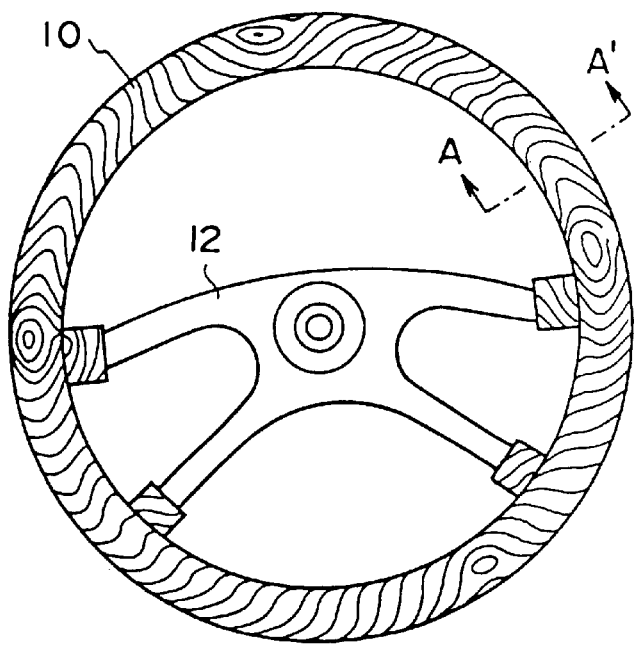
FIG. 1 is a schematic structural view illustrating an embodiment of a simulated wood tone member of the present invention.
Figure 2:
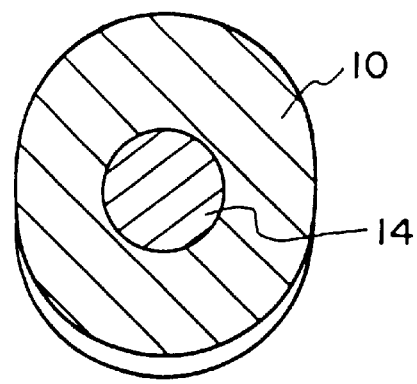
FIG. 2 is a cross-sectional view taken along line A–A' of FIG. 1.

FIG. 1 is a schematic structural view illustrating a preferable embodiment of a wood-grained steering wheel of the present invention. As shown in FIG. 1, a spoke portion 12 is mounted to an annular urethane mold 10. As illustrated in FIG. 2, the annular urethane mold 10 is formed such that a rim portion core member 14 is disposed in the interior of the annular urethane mold 10.

Figure 3:
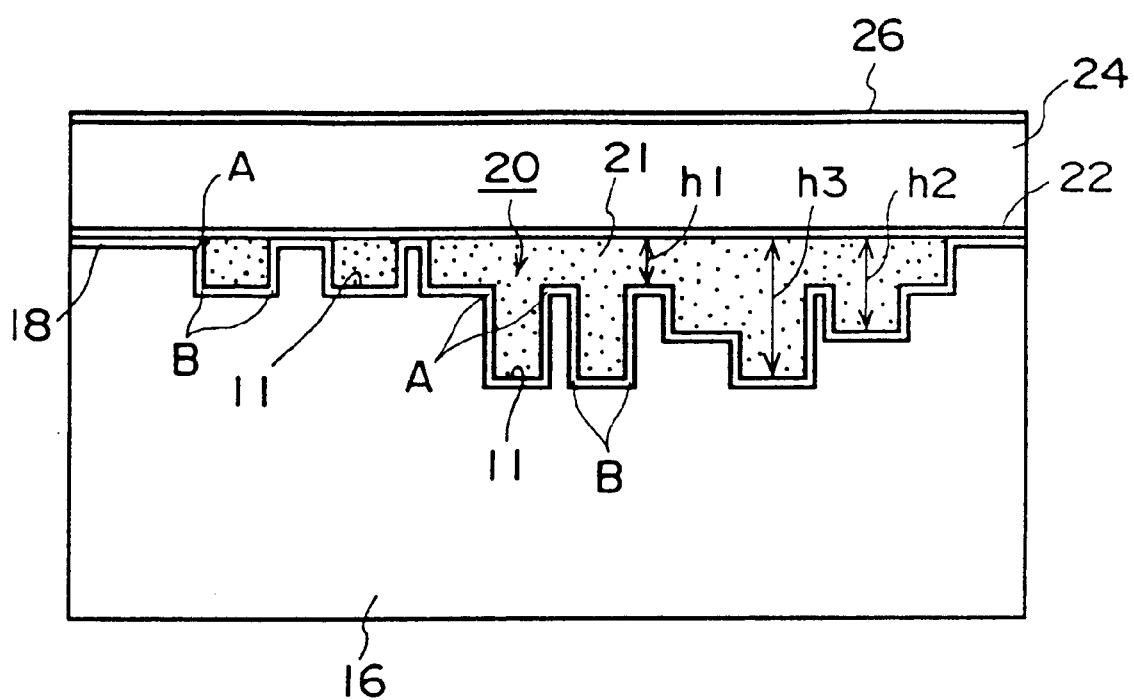
FIG. 3 is an enlarged view of main portions of FIG. 2.

As illustrated in FIG. 3, the surface side of the urethane mold 10 is formed by a urethane (based) base member 16, an in-mold coating layer 18, a wood filler portion (vein portion) 20, a color clear layer 22, an intermediate coat clear layer 24, and a top coat clear layer 26. The urethane base member 16 has a Shore A hardness of 75 or more, a Shore D hardness of 20 or more, an elongation percentage of 80 to 300%, and a density of 0.3 to 0.9 g/cm$^3$, and preferably has a Shore A hardness of 85 to 95, a Shore D hardness of 30 to 40, an elongation percentage of 100 to 200%, and a density of 0.4 to 0.5 g/cm$^3$.

Here, the Shore A hardness is hardness as stipulated in JIS K-6253 Type A, and the Shore D hardness is hardness as stipulated in JIS K-6253 Type D.

When the urethane base member 16 has a Shore A hardness of 75 or more, a Shore D hardness of 20 or more, and a density of 0.3 to 0.9 g/cm$^3$, the feel is similar to that of actual wood. In particular, when the urethane base member 16 has a Shore A hardness of 85 to 95, a Shore D hardness of 30 to 40, and a density of 0.4 to 0.5 g/cm$^3$, the feel is even more similar to that of actual wood. However, from the standpoint of reliably preventing damage or the like of the steering wheel at the time of a collision, the elongation percentage of the urethane base member 16 is 80 to 300%, and more preferably is 100 to 200%.

In order to prepare a polyurethane (PU) which forms the urethane base member 16 having such characteristics, a polyol component and an isocyanate component are arbitrarily selected, and the compounded amount of the cross-linking agent (e.g., ethylene glycol) is made greater than conventional compounded amounts.

In the present invention, examples of the polyol component for manufacturing the urethane base member 16 are polyether polyols, polyester polyols and the like. However, polyether polyols are particularly preferable. Among polyether polyols, trifunctional polyether polyols are preferable from the standpoints of ease of elongation and increasing the hardness of the urethane base member.

Tolylenediisocyanates (TDI) and diphenylmethane diisocyanates (MDI) can be used as the isocyanate component. Among these, diphenylmethane diisocyanates (MDI) are preferable from the standpoints of increasing the hardness of the urethane base member, low toxicity, and ease of elongation. Among diphenylmethane diisocyanates (MDI), prepolymer modified MDI, polymeric modified MDI, carbodiimide modified MDI, pure MDI and the like can be arbitrarily compounded in accordance with the desired properties.

In manufacturing the urethane base member of the present invention, in addition to the polyol component and the isocyanate component, cross-linking agents, catalysts, blowing agents, cell stabilizers, and the like may be used. In addition, flame retardants and the like may also be included.

Examples of the cross-linking agent include low molecular weight polyols such as ethylene glycol, diethylene glycol, butane diol, dipropylene diol, trimethylol propane, and glycerin; amine based low molecular weight polyols such as triethanol amine and diethanol amine; and aliphatic and alicyclic amines. Examples of the catalyst include tertiary amines such as triethylene diamine, triethylamine, N-methylmorpholine, and N-ethylmorpholine; tin (I) octenoate, tin (II) dibutyllaurate, and the like. Examples of the blowing agent include water; halogenated alkanes such as trichloromonofluoromethane and dichloromonofluoromethane; azobisisobutyronitrile; and the like.

In manufacturing the urethane base member 16 of the present invention, selection of the mixing ratio of the polyol component and the isocyanate component is important. The mixing ratio should be set in accordance with the desired properties of the urethane base member. For example, a ratio of polyol component/isocyanate component of 90 to 110/113 to 133 is preferable.

In FIG. 3, as the in-mold coating layer 18 formed on the urethane base member 16 becomes the base color of the color expressed in the steering wheel, the in-mold coating layer 18 contains a pigment having high concealability. Urethane coating materials, and non-yellowing urethane coating materials in particular, are preferable. The thickness of the in-mold coating layer 18 is preferably about 10 to 20 μm.

In FIG. 3, the wood filler 21, which contains a coloring agent, is filled in the vein portions 20 provided in the urethane base member 16. The wood filler 21 is a transparent material, and examples thereof include water-based wood fillers, oil-based wood fillers, and synthetic resin wood fillers. By including a coloring agent such as a dye in any one of such types of fillers, the wood grain of the vein portions 20 can be formed.

The color clear layer 22 has a hue which is for providing the desired wood-like appearance by the complementary color effect based on the relationship of the color clear layer 22 with the base color of the in-mold coating layer 18. Accordingly, polyurethane coating materials, two-solution-type polyurethane coating materials or the like are used in the color clear layer 22, such that the color clear layer 22 is a transparent color. The thickness of the color clear layer 22 is preferably 10 to 30 μm.

The intermediate coat clear layer 24 may contain a transparent urethane based or polyester based coating material which imparts the impression of thickness and provides the urethane mold 10 with the texture of wood. The thickness of the intermediate coat clear layer 24 is preferably 50 to 500 μm.

The top coat clear layer 26 is provided in order to impart the urethane mold 10 with surface properties, and arbitrary components may be used therein in accordance with the desired surface properties. For example, any of various type of urethane based coating materials having characteristics such as light fastness, UV-light cutting ability, water resistance, chemical resistance or the like may be used. The thickness of the top coat clear layer 26 is preferably 10 to 50 μm.

Figure 4:
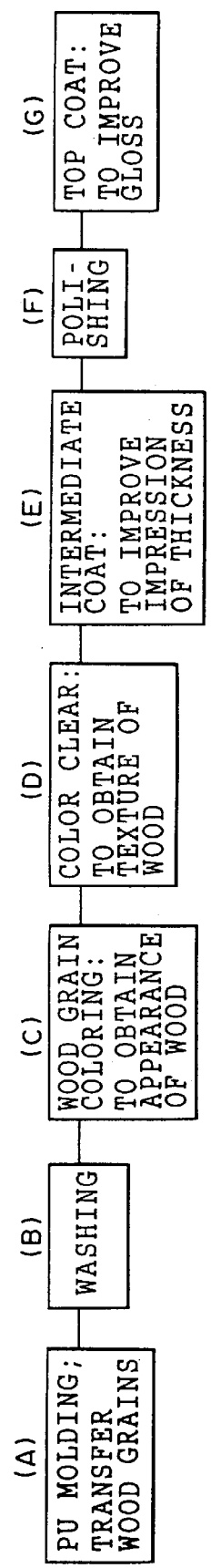
FIG. 4 is a process diagram illustrating a preferred embodiment of a method for manufacturing a simulated wood tone member of the present invention.

FIG. 4 is a process diagram illustrating a preferred embodiment of the method of manufacturing the wood-grained steering wheel of the present invention. FIG. 5 is a process diagram illustrating processes of etching, in plural stages, a mold for molding the simulated wood tone member.

First, embossment processing is carried out by etching, in plural stages, a wood-grain pattern directly in a mold 30 (see FIG. 5) which is made of iron or aluminum and in which the configuration of a steering wheel has been formed by cutting or casting.

Figure 5A:
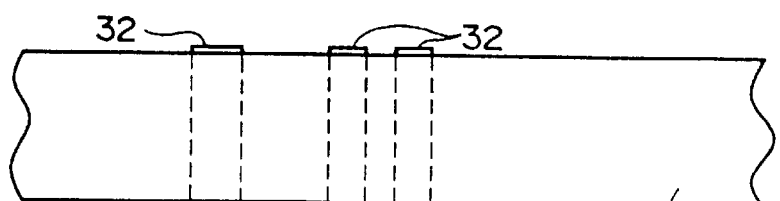
FIGS. 5A to 5G are process diagrams illustrating processes for etching, in plural stages, a mold for molding the simulated wood tone member of the present invention.
Figure 5B:
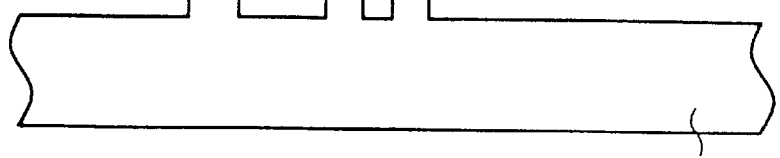
Figure 5C:
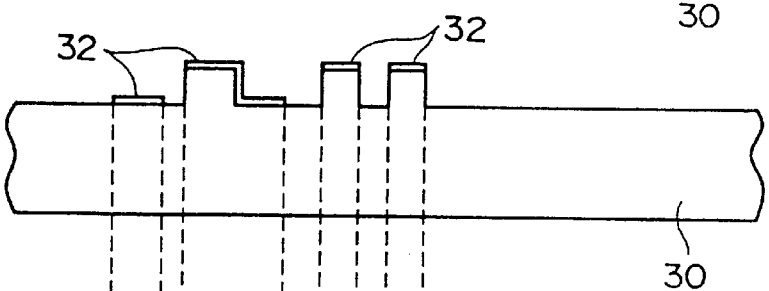
Figure 5D:
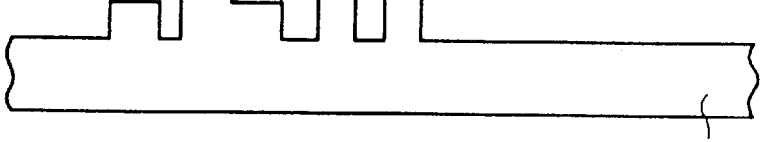
Figure 5E:
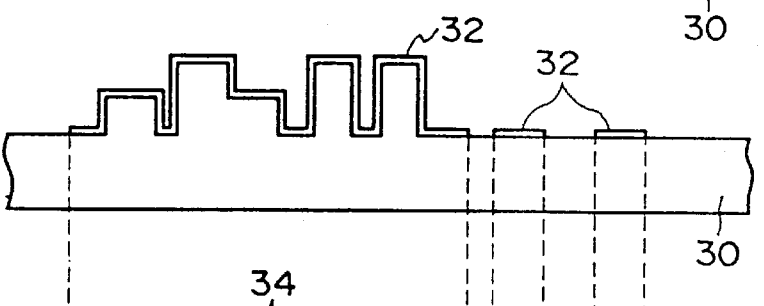
Figure 5F:
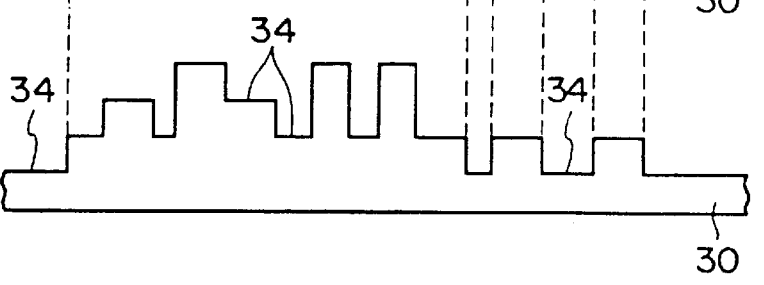

More specifically, as illustrated in FIG. 5A, masking 32 is applied by tape or the like to predetermined positions of the mold 30, and a first stage of etching is carried out. As a result, as illustrated in FIG. 5B, the portions of the mold 30 other than the portions covered by the masking 32 are corroded by acid. Next, as illustrated in FIG. 5C, masking 32 is applied to predetermined positions, and the second stage of etching is carried out. As a result, as illustrated in FIG. 5D, the portions of the mold 30 other than the portions covered by the masking 32 are corroded by acid. Next, as illustrated in FIG. 5E, masking 32 is applied to predetermined positions, and the third stage of etching is carried out. As a result, as illustrated in FIG. 5F, the portions of the mold 30 other than the portions covered by the masking 32 are corroded by acid. In this way, by etching the mold 30 in plural stages, recesses 34 having different depths are formed at the inner surface of the mold 30, and a wood-grain pattern is formed by these recesses 34. In the above-described etching, the recesses 34 are formed successively starting from the most shallow recesses 34. Thus, etching is carried out efficiently, and the time required for etching can be made as short as possible.

Figure 5G:
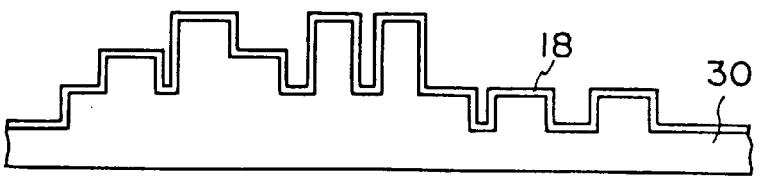
Figure 6:
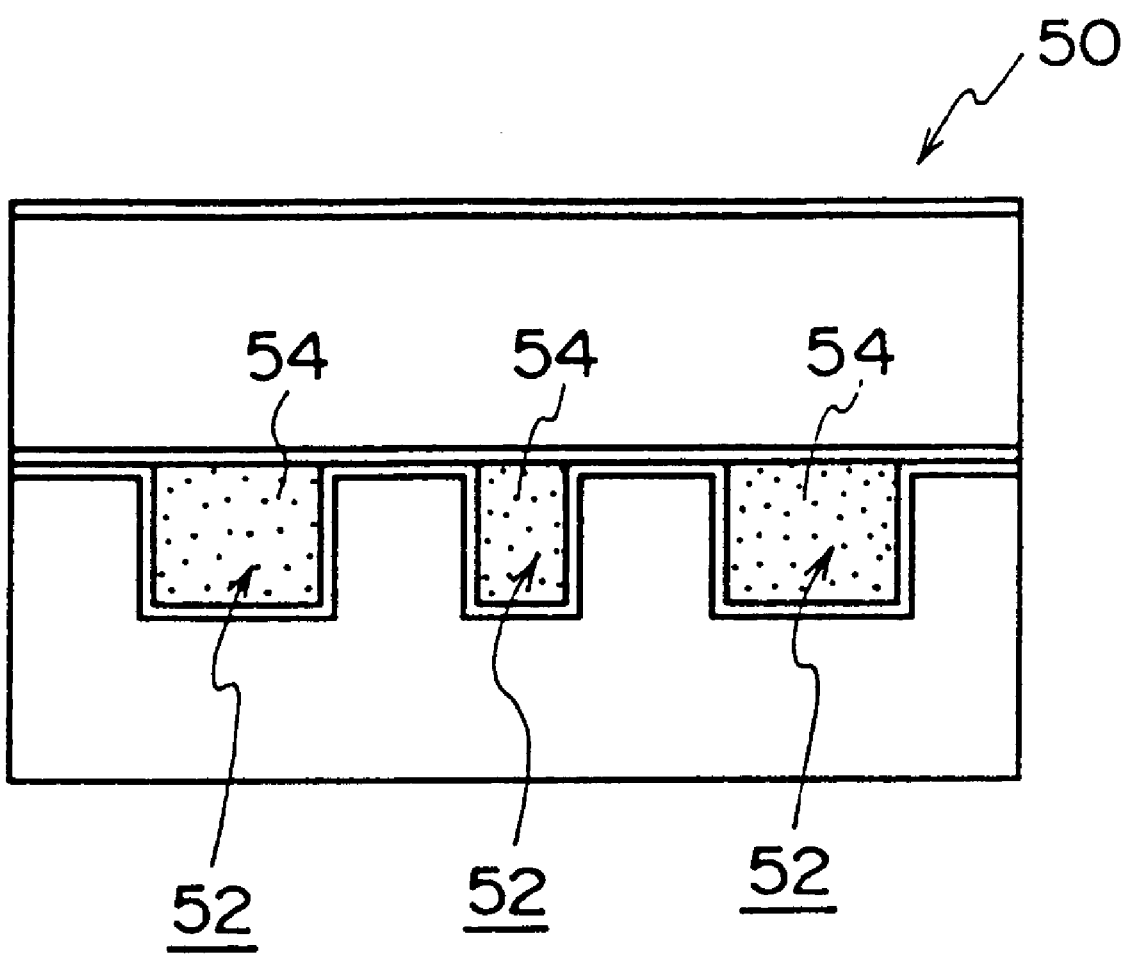
FIG. 6 is a cross-sectional view of a conventional simulated wood tone member.

Next, as illustrated in FIG. 5G, the in-mold coating is formed on the inner surface of the mold 30 in which the wood-grain pattern has been formed, so as to form the in-mold coating layer 18 to which the wood grains have been transferred. In this case, if needed, a releasing agent or the like may be applied onto the inner surface of the mold 30 before the in-mold coating is formed.

Next, after the rim portion core 14 and the like are set at predetermined positions in the mold 30, the urethane based composition is injected into the mold 30. In this way, the urethane based composition is injected in a state in which the in-mold coating has been formed on the inner surface of the mold at which the wood-grain pattern is present. Thus, a single layer of the in-mold coating which is prepared from urethane coating material is applied on the surface of the molded product. In this way, at the time of coating of the like, foam which is generated from the urethane mold 10 cannot enter into the layer coated thereon. Thus, an attractive, wood-grained, coated product can be obtained. Then, after the urethane based composition has been injected, the urethane based composition is left to stand for a predetermined time and hardens, and the urethane mold 10 is thus formed (see (A) in FIG. 4).

The embossment width and the embossment length of the embossments formed in the surface of the urethane mold 10 are substantially the same as those of real wood (natural wood). Further, the embossment depth (the depth of the recess 11) is 2 to 5 times the depth of a grain of real wood (the grain depth of real wood is 0.02 mm or less), and is preferably 3 to 4 times the depth of a grain of real wood. That is, the embossment depth is preferably formed in plural stages such that the depth is 3 to 4 times the depth of a grain of real wood. Accordingly, the depth of the wood grain embossment is preferably 0.02 to 0.1 mm. In the present embodiment, the depth of the most shallow wood grain embossment is 0.02 mm (h1 in FIG. 2), the depth of the deepest wood grain embossment is 0.06 mm (h3 in FIG. 3), and the depth of an intermediate wood grain embossment is 0.04 mm (h2 in FIG. 3).

The angle portion of the embossment portion (recess 11) (in FIG. 3, an angle portion is denoted by A), and a corner portion of the bottom portion of the embossment portion (recess 11) (in FIG. 3, a corner portion is denoted by B) are preferably formed in right-angle configurations. By forming these portions at right-angles, the wood filler 21 can reliably be filled into the recess 11, and the wood-grain pattern can reliably be expressed.

If the depth of the wood grain embossment is less than 0.2 mm, when the wood filler 21 is filled into the grains as will be described later and the excess wood filler 21 is wiped off, the wood filler 21 does not remain in the embossment portions 11. Thus, it is difficult for the wood grains to be colored and to provide the impression of real wood. On the other hand, when the depth of the wood grain embossment is greater than 0.1 mm, when etching is carried out to form the embossments in the mold 30, the corner portions of the wood grain embossments in the mold 30 have an R (rounded or curved) configuration. Thus, the angle portions (denoted by A in FIG. 3) of the embossment portions (the recesses 11) and the corner portions (denoted by B in FIG. 3) of the bottom portions of the embossment portions (recesses 11) have an R configuration. A slight amount of wood filler which remains at these R portions leads to a blurring of the outlines of the wood grains, making it difficult to obtain clearly defined wood grains, which is not preferable.

Next, the urethane mold 10 is removed from the mold 30 and is washed. In the washing step, the releasing agent, oils, and the like adhering to the surface of the urethane mold 10 are removed. Thus, a water washing method using any of various types of detergents, or a washing method using an organic solvent is used (see (B) in FIG. 4).

Next, in order to provide the urethane mold 10, in whose surface the wood grains have been formed, with the impression of real wood, a transparent wood filler containing a coloring agent is filled in the wood grains, such that the vein portions of the wood grain embossments are made to contrast prominently with the background wood portions (see (C) in FIG. 4). The wood filler substantially contains 30% toner as a coloring agent, and the toner contains only 2.5 to 0% black pigment. The amount of the black pigment in the toner is less than that of a general toner, and thus, transparency of the wood filler is provided. In this way, the light reaches to the far portions of the recesses 11, and clearly defined gradations corresponding to the depths of the recesses 11 can be obtained. The toner preferably also includes pigments other than black pigment (e.g., red pigment or yellow pigment or the like).

Thereafter, in order to provide the texture of real wood, the color clear layer 22 is formed ((D) in FIG. 4). Thereafter, in order to improve the impression of thickness, the intermediate coat layer 24 is formed ((E) in FIG. 4). Thereafter, the surface of the intermediate coat layer 24 is polished ((F) in FIG. 4).

The method of polishing is not particularly limited, but polishing by using sandpaper is preferable.

Subsequently, the top coat clear layer 26 is formed on the surface of the polished intermediate coat clear layer 24 (see (G) in FIG. 4). The top coat clear layer 26 is formed from arbitrary urethane based components in accordance with the characteristics required of the urethane mold 10.

In this way, in accordance with the present embodiment, by carrying out molding in the mold 30 which has been formed by etching in plural stages, a wood grain pattern having good gradation (shading) can be provided at the surface of the urethane mold 10. By filling, into the wood grain grooves, the wood filler which has good transparency and contains a coloring agent, the colors of the wood grains vary in accordance with the depths of the wood grain embossments. Thus, a wood grain pattern having a beautiful wood appearance with attractive grains can be provided.

In the above-described embodiment, explanation is given in connection with a steering wheel. However, with the above-described structure, the simulated wood tone member of the present invention can exhibit the same effects when applied to members at the interior of vehicles (e.g., a center panel (the panel for the air conditioner switch or the like), a door side panel, a shift lever knob, a window switch panel, the knob of a combination lever switch (for the wipers or lights), or the like), or members at the interior of a house (e.g., door knobs, lampshades), and the like.

EXAMPLES

Examples of the present embodiment will be described hereinafter.

Example 1

An iron mold, in which the configuration of a steering wheel was formed by cutting or casting, was subjected to etching in two stages, such that embossments in a wood grain pattern were formed therein. The embossment depth of the shallow embossments was 0.02 mm, and the embossment depth of the deep embossments was 0.04 mm. The design surface within the mold (the surface at which the wood grain grooves were formed) was in-mold coated by a urethane coating material. In this in-mold coating process, an in-mold coating layer having a thickness of 15 μm was formed by using a non-yellowing urethane coating material (IPDI based urethane coating material) containing a pigment (OZRAY-MV manufactured by DIC Corp.) having good concealability. Thereafter, a rim portion core member and a spoke portion core member were set at predetermined positions within the mold. Then, a urethane resin liquid, which was formed from the following compositions and which was to become the urethane based base member, was injected into the mold.

Polyol Compound
trifunctional polyetherpolyol (MW=5000 to 7000)
trifunctional polyether polymer polyol (MW=5000 to 7000)
cross-linking agent: ethylene glycol
catalysts:
  (1) DABCO-EG (manufactured by Sankyo Air Product Co.)
  (2) TOYOCAT-ET (manufactured by Toso Co.)
anti-oxidant
blowing agent: water
Isocyanate Compound
prepolymer modified MDI
polymeric MDI
carbodiimide modified MDI
pure MDI In the urethane resin liquid, the compounded weight ratio of the above polyol compounded composition/the above isocyanate compounded composition was 100/122.

Next, after the urethane resin liquid was injected into the mold, the urethane resin liquid was left to stand for about 70 seconds so that it hardened, and the steering wheel was then removed from the mold.

The properties of the urethane resin layer obtained from the urethane resin liquid at this time were as follows.

(1) Shore A hardness: 85
(2) Shore D hardness: 30
(3) Elongation percentage: 120%
(4) Density: 0.45 g/cm$^3$
(5) Tensile strength: 8 Mpa Next, the steering wheel removed from the mold was washed with a petroleum based solvent because releasing agent, oils, and the like had adhered to the surface of the steering wheel.

Thereafter, ROMEN FILLER (manufactured by Mikuni Paint Co.), which is a transparent wood filler and comprises a coloring agent, was filled into the wood grains, and the excess wood filler was wiped off.

Then, a color clear layer having a thickness of 20 μm was formed on the surface of the urethane resin layer, by using a semi-transparent, non-yellowing urethane coating material (IPDI based urethane coating material) containing a highly transparent pigment (OZRAY-MV manufactured by DIC Corp.). Hues characteristic of wood grains were obtained by the complementary color effect between the hues of the color clear layer and the hues of the in-mold coating layer.

An unsaturated polyester coating material (manufactured by Mikuni Paint Co.) or a two-solution-type polyurethane coating material was coated once or twice on the color clear layer, so as to form an intermediate coat clear layer having a thickness of about 300 μm. Next, the surface of the intermediate coat clear layer was polished by using #600 sandpaper. Thereafter, a top coat clear layer, which had a thickness of 30 μm and was formed from a two-solution-type polyurethane coating material (manufactured by Mikuni Paint Co.) was formed on the intermediate coat clear layer.

The urethane steering wheel obtained as described above had preferable characteristics such as Shore hardnesses, elongation percentage, density, and the like, and further, it was difficult for cracks or breaks to form therein at the time the steering wheel deformed during a collision. Further, the wood grain pattern could be provided with good gradation, and the shading of the wood grain embossments could be varied. Thus, an attractive wood grain pattern could be formed.

In accordance with the simulated wood tone member of the present invention, a wood grain pattern having an attractive wood look can be obtained by varying the depths of the recesses formed in the surface of the simulated wood tone member and by filling the recesses with a wood filler which is transparent and contains a coloring agent.

Further, in accordance with the method of manufacturing a simulated wood tone member of the present invention, a simulated wood tone member which has a wood-grain pattern having an attractive wood look can be manufactured.

What is claimed is:

1. A simulated wood tone member comprising:

(a) a urethane-based base member having a surface with recesses formed to different depths and forming a pattern; and (b) a wood filler disposed in the recesses, the wood filler being substantially transparent and comprising at least one coloring agent.

2. The simulated wood tone member of claim 1, wherein substantially each recess includes an angle portion and a bottom portion having a corner portion, the angle portion and bottom portion each being substantially right angles.

3. The simulated wood tone member of claim 1, wherein each recess includes a bottom, and the wood filler is substantially transparent to a degree sufficient to allow light to pass therethrough to the bottom of the recess.

4. The simulated wood tone member of claim 1, wherein the urethane-based base member has a Shore A hardness of at least 75, a Shore D hardness of at least 20, and a density from 0.3 to 0.9 g/cm$^3$.

5. The simulated wood tone member of claim 1, wherein the urethane-based base member has a Shore A hardness of 85 to 95, a Shore D hardness of 30 to 40, and a density from 0.4 to 0.5 g/cm$^3$.

6. The simulated wood tone member of claim 1, wherein the urethane-based base member has a elongation percentage from 80 to 300 percent.

7. The simulated wood tone member of claim 1, wherein the urethane-based base member is prepared from at least a polyol component and an isocyanate component.

8. The simulated wood tone member of claim 7, wherein the polyol component includes polyether polyol.

9. The simulated wood tone member of claim 7, wherein the isocyanate component includes diphenylmethanediisocyanate.

10. The simulated wood tone member of claim 7, wherein the urethane-based base member includes at least one additive selected from the group consisting of cross-linking agents, catalysts, blowing agents, cell stabilizers and flame retardants.

11. The simulated wood tone member of claim 7, wherein a ratio of the polyol component to the isocyanate component is from 90 to 110 of polyol component to 113 to 133 of the isocyanate component.

12. The simulated wood tone member of claim 1, further comprising at least one layer selected from the group consisting of an in-mold coating layer, a color clear layer, an intermediate coat clear layer, and a top coat clear layer.

13. The simulated wood tone member of claim 1, wherein the recesses form a wood grain embossment having a depth from 0.02 to 0.1 mm.

14. The simulated wood tone member according to claim 1, wherein the wood filler comprises toner in amount substantially equal to 30 percent of the wood filler, and the toner includes up to 2.5 percent black pigment.

\* \* \* \* \*